(No Model.)

G. ARMSTRONG.
TANK HEATER.

No. 407,988. Patented July 30, 1889.

Witnesses:
J. P. Theo Lang.
E. J. Fenwick

Inventor:
George Armstrong
by his Attys
Mason, Fenwick and Lawrence

N. PETERS, Photo-Lithographer, Washington, D. C.

UNITED STATES PATENT OFFICE.

GEORGE ARMSTRONG, OF ELMIRA, ILLINOIS.

TANK-HEATER.

SPECIFICATION forming part of Letters Patent No. 407,988, dated July 30, 1889.

Application filed February 2, 1889. Serial No. 298,474. (No model.)

*To all whom it may concern:*

Be it known that I, GEORGE ARMSTRONG, a citizen of the United States, residing at Elmira, in the county of Stark and State of Illinois, have invented certain new and useful Improvements in Tank-Heaters; and I do hereby declare the following to be a full, clear, and exact description of the invention, such as will enable others skilled in the art to which it appertains to make and use the same.

My invention relates to tank-heaters, and especially to that class which is adapted to be set in a tank containing water which is to be heated by it; and it consists in certain novel constructions, combinations, and arrangements of parts, as will be hereinafter described and specifically claimed, whereby water for use on farms can be heated to any desired degree of temperature with very little labor and at a very slight cost.

Figure 1:
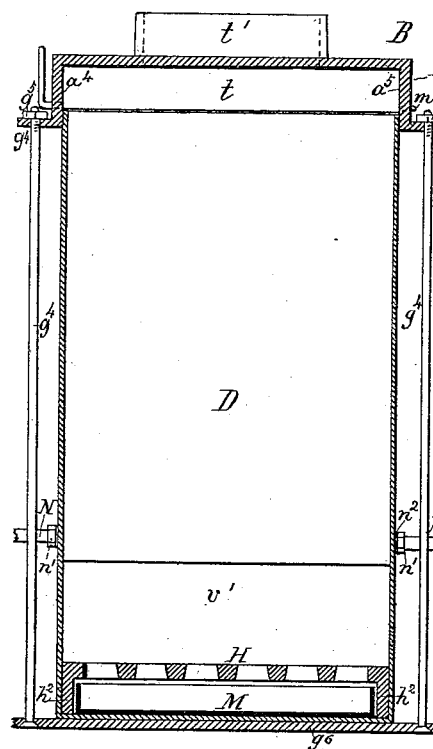
Figure 2:
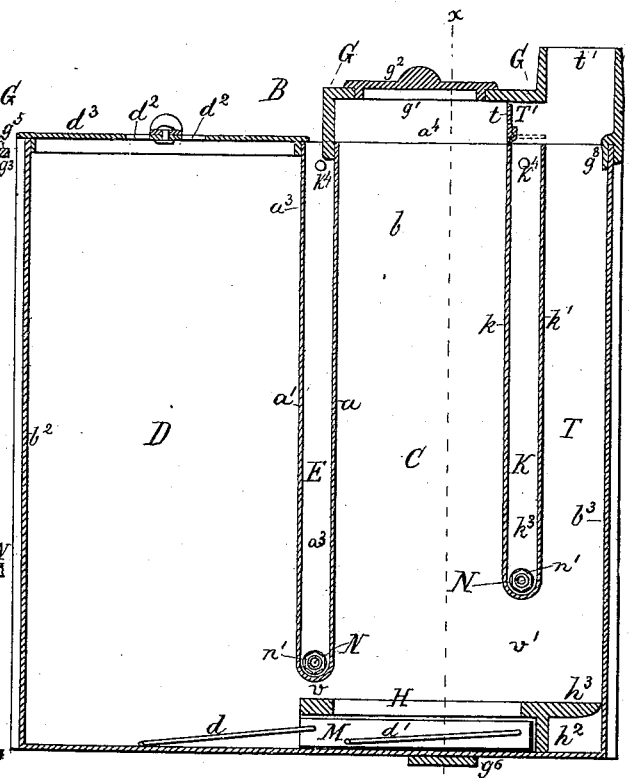
Figure 4:
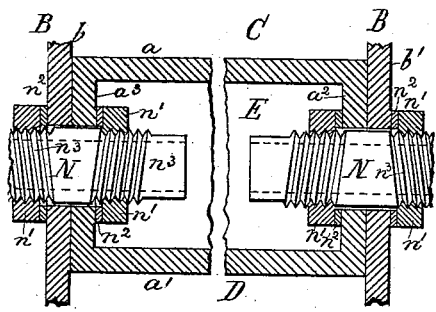
Figure 3:
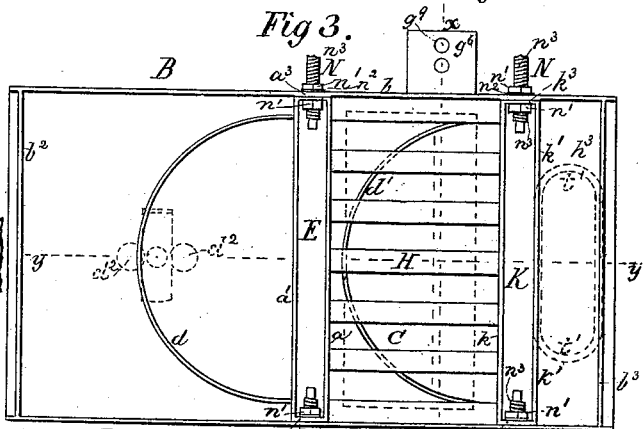
Figure 5:
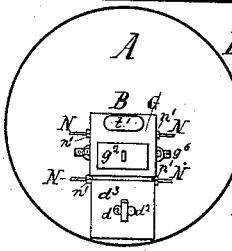

In the accompanying drawings, Figure 1 is a transverse section in the lines $x\ x$ of Figs. 2 and 3 through the fire-chamber proper. Fig. 2 is a vertical longitudinal section in the line $y\ y$ of Fig. 3. Fig. 3 is a top view of the heater with the dome portion removed. Fig. 4 is an enlarged broken horizontal section through the tank-heater and one of the hollow water-heating partitions, showing more plainly the screw-threaded circulation and clamping tubes and their confining-nuts and packing-gaskets. Fig. 5 is a plan view of the tank with the heater placed in it, and Fig. 6 an inverted plan of the dome portion of the combustion-chamber.

My invention is especially applicable for use on farms having few or no surface streams, the water for feed purposes being pumped from dug wells into large cisterns or stock-watering tanks. In very cold weather the water in the tank often freezes solid, making it impossible for the stock to drink and causing great hardships and inconveniences; or even if the weather should not be so cold as to cause the water to freeze, yet the temperature of the water is too low to be fed to animals, as experience has shown that such water is very injurious.

My invention is designed to overcome these difficulties and to make such apparatuses more efficient and enduring and to combine simplicity, cheapness, and utility.

In the drawings, A represents the tank and B the heater, the heater comprising, mainly, a combustion-chamber C, an attendant's chamber D, and water-chambers E and K, formed by the double walls $a\ a'$ and $k\ k'$. By means of the partition-walls $a\ a'$ the combustion-chamber C and attendant's chamber D are separated from the top down to within a short distance of the grate, and by the walls $k\ k'$ and the end wall $b^3$ of the heater an indirect-draft flue-chamber T, extending from the top a proper distance, as shown, is formed, and at the same time water heating and circulation chambers E and K and horizontal communicating spaces $v\ v'$ are secured, for purposes presently described. The communicating space $v$ is of sufficient size for the insertion of a grate H and an ash-pan M, and also for the insertion of a poker above the grate; and the space $v'$ is of a greater size, so as to form a large horizontal flue-passage leading from the combustion-chamber into the indirect-draft flue-chamber T, and serving as such in connection therewith when the heater is used as a base-burner instead of a surface-burner, as will be hereinafter described. The respective water-heating chambers are closed at bottom and open at top, and are provided, respectively, near their bottoms with circulation pipes or tubes N N, through which water flows from the tank into the chambers, and out of which it flows again into the tank after it has been heated, and thereby aids in heating the body of water in the tank. As fast as hot water flows out of the chambers cooler water takes its place. By means of the water in the chambers E and K the rapid burning out of the partition-walls is avoided, and by partially having the heater immersed in water the end walls of the combustion-chamber are also insured from rapid destruction, although of light galvanized iron, which can be quickly heated.

The end walls $a^2\ a^3$ of the water-heating chamber E and the end walls $k^2\ k^3$ of the water-heating chamber K are secured to the side walls of the heater by one or more bolts or rivets $k^4$ or otherwise, and by pipes N, which are passed through coinciding openings in the end walls $a^2\ a^3$ of the water-heating chamber E, in the end walls $k^2\ k^3$ of the water-heating chamber K, and side walls of the heater, and the inner ends of these pipes being in the water-space in the water-heating chambers and the outer ends in the water-space in the tank or cistern A. On the ends of these tubes or pipes N suitable screw-threads $n^3$ are cut, on which are applied nuts $n'$, and between the nuts and the outside surfaces of the heater on the one end and the nuts and interior surfaces of the water-heating surfaces on the other end are placed gaskets $n^2$, which serve for tightly packing the joints. These tubes serve several important uses in my invention, for, first, by means of the said pipes water is free to flow from the tank into the water-heating chambers E and K, and after being heated to flow out again into the tank, thus making my heater a circulation as well as a surface heater; secondly, by tightly turning the nuts $n'$ toward each other they securely tie and hold the walls of the heater and end walls of the water-heating chambers together, as well as by the aid of the nuts and gaskets render the joints about the pipes water-tight, thus preventing leakage into the fire or combustion-chamber.

The combustion-chamber C is formed by the side walls $a$ and $k$ of the water-heating chambers E and K, respectively, and by the side walls of the heater B, and is entirely surrounded by water. Thus while the walls $b\ b'$ are protected and prevented from rapidly burning out by means of the water in the tank A the walls $a$ and $k$ are protected by reason of the constant circulation of water in the water-heating chambers.

Beneath the combustion-chamber C, I have arranged a sliding table-grate H, which is inserted through the horizontal space $v$, and rests, by means of a horizontal flange $h^2$, upon the bottom of the tank-heater and forms the bottom of the fire-chamber C. This grate has a stop-shelf $h^3$, which extends under the indirect flue-chamber T, and prevents ashes and cinders from falling down behind the grate. Above the grate a poker-space is formed by the opening $v$, and below the grated surface of the grate in front the angular flange $h^2$ is cut away and an ash-pan M introduced (through the attendant's chamber D and the space $v$) beneath the grate. This ash-pan is provided with bails $d\ d'$ for withdrawing the ash-pan and replacing it under the grate. The bails $d\ d'$ are so arranged that when the pan is in place beneath the grate the bail $d$ folds outward and lies flat on the bottom of the attendant's chamber, while the bail $d'$ folds flat on the bottom of the ash-pan, as shown in Fig. 3. The ash-pan has its front end cut away, the object being to leave a space for the insertion of a hooked poker to stir out the ashes between the bars of the grate. To remove the pan, it is simply necessary to grasp the outside bail $d$ and draw the pan outward into the attendant's chamber and then grasp bail $d'$ with the same hand and raise and withdraw the pan through the attendant's chamber.

The attendant's chamber D is formed by the side walls and end wall of the heater and the side wall $a'$ of the water-heating chamber E. By means of the chamber D air is supplied to the fire through the draft-register holes $d^2$ in the lid or cover $d^3$ of said chamber, and thus perfect control kept over the fire. This chamber, as already stated, gives ready access to the attendant for operating the ash-pan and removing ashes therefrom and otherwise manipulating the fire beneath the combustion-chamber.

At the opposite end of the heater to that in which the attendant's chamber is situated, or between the water-heating chamber K and the end wall $b^3$ of the heater, I have arranged an indirect-flue chamber which serves for conducting the products of combustion upward out into the air. Above and to the left of this indirect-flue passage and in the direct-flue passage T' a damper $t$ is placed, which damper, when turned down, causes the draft in the combustion-chamber C to be upward through the fuel and direct to the stove-pipe collar $t'$, but when turned up causes the draft to pass along the base portion of the fuel into the indirect-draft flue-chamber between the water-heating chamber K and the end wall $b^3$ of the heater. Thus it will be readily seen that my heater is either a base or a surface burner.

Figure 6:
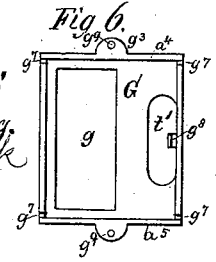

Over the top of the combustion-chamber C, water-heating chamber K, and indirect flue T, and also over a slight portion of the water-heating chamber E, the cast-metal dome or cap portion G is applied. This dome extends up two or three inches higher than the walls of the body portion of the heater, so as to form the direct-flue passage T' and accommodate the damper $t$. Cast with the dome portion and directly over the indirect-flue passage T and in communication with the direct-flue passage T' is a smoke-pipe collar $t'$, and in this dome, over the top of the combustion-chamber, is provided a fuel-supply opening $g'$, through which fuel is introduced into the said chamber, and over this opening a lid $g^2$ is fitted, which is kept closed during the operation of the heater. On the end of the dome is a lug $g^8$, and on the outer edges of the dome, at each corner, as shown in Fig. 6, are provided grooves $g^7$, which with the lug receive the upper edges of the body portion of the heater, and whereby the dome portion and the body are connected and the dome portion kept from side and endwise movement.

On the sides $a^4\ a^5$, respectively, of the dome is cut a hole for the reception of the pivot end of the damper $t$ and a slot for the insertion of the other end of the damper, said slot serving as a recess for the reception of the handle or arm of the damper, which, after being placed in said slot, is held in horizontal position by the upper edge of the body portion of the heater. On each end of the yoke-strap $g^6$ a hole $g^9$ is provided, whereby the heater can be secured to the bottom of the tank and thus prevented from floating.

It is obvious that the identical tank-heater herein described can have its partition-walls single instead of double; that the indirect-draft flue-chamber can be dispensed with by leaving out the double walls of chamber K, or by setting this chamber close against the right-hand end wall $b^3$; that the chamber K may be used and chamber E dispensed with by using double walls for chamber K and a single wall at the place where chamber E is located; or that chamber E may be used and chamber K left off, and that the draft-directing damper can be dispensed with when the indirect-flue chamber is not employed; but I regard the heater constructed substantially as shown far preferable to any of these modifications.

The water-tank A may be of ordinary construction and of any desired form, either round or square, either metal or wood, and of any desired size, say from eight to ten feet in diameter and from three to four feet in depth. This tank is filled or nearly filled with water, in which the heater B is partly immersed.

The heater is constructed, preferably, of galvanized sheet-iron, with the exception of the grate H and the dome or cap portion G, which are constructed of cast metal. This heater may be of any desired size and shape; but for use in connection with a tank of the dimensions above mentioned it should be about twenty-eight or twenty-nine inches long, fourteen inches wide, and twenty-eight inches deep.

What I claim is—

1. A tank-heater comprising in its construction an attendant's chamber having means for admission of air, a combustion-chamber having feed-door and draft-flue, one or more hollow water-heating partitions having a horizontal space or spaces beneath them, and circulation-pipes, in combination with a surrounding water-tank, in which it is partly immersed, substantially as and for the purpose described.

2. A tank-heater comprising a high vertical combustion-chamber having a fuel-supply door, an attendant's chamber, a draft-register applied to the attendant's chamber, a direct-draft flue, an indirect-draft flue-chamber, the partitions having horizontal spaces beneath them between said chambers, a sliding grate, and a draft-controlling damper applied to the combustion-chamber, substantially as and for the purpose described.

3. The combination, in a tank-heater, of the attendant's chamber, the combustion-chamber, a water-heating chamber between the attendant's and combustion chamber, and circulation-pipes, substantially as and for the purpose described.

4. The combination, in a tank-heater, of the attendant's chamber, a draft-register applied to the attendant's chamber, combustion-chamber, an indirect-draft flue-chamber, water-heating chamber between the combustion and indirect-flue chambers, the partitions between the attendant's, combustion, and indirect-flue chambers, having horizontal spaces beneath them, a grate, and a draft-controlling damper applied to the combustion-chamber, substantially as described.

5. The combination, in a tank-heater, of the attendant's chamber, a draft-register applied to the attendant's chamber, a combustion-chamber, a direct-draft flue, an indirect-draft flue-chamber, water-heating chambers between the attendant's, combustion, and direct-draft flue chambers, circulation pipes or tubes, the partitions of the chambers having horizontal spaces beneath them, a grate, and a draft-controlling damper applied to the combustion-chamber, substantially as described.

6. A tank-heater comprising the attendant's chamber, the combustion-chamber, the partition between said chambers with a space below it, draft-register, and the direct-flue passage, substantially as and for the purpose described.

7. A tank-heater comprising an attendant's chamber having means for admission of air, a combustion-chamber having a supply-door and a controlling-damper in its draft-flue, hollow water circulating and heating partitions having horizontal spaces beneath them, and circulation-tubes, substantially as described.

8. In a tank-heater, the combination, with the outer wall, of one or more hollow water-heating partitions, screw-threaded circulation and tie tubes, and binding-nuts, substantially as described.

In testimony whereof I hereunto affix my signature in presence of two witnesses.

GEORGE ARMSTRONG.

Witnesses:
 ROBERT ARMSTRONG,
 DUNCAN MCLENNAN.